(12) United States Patent
Kern et al.

(10) Patent No.: US 6,653,821 B2
(45) Date of Patent: Nov. 25, 2003

(54) SYSTEM CONTROLLER AND METHOD FOR MONITORING AND CONTROLLING A PLURALITY OF GENERATOR SETS

(75) Inventors: Robert D Kern, Waukesha, WI (US); Gerald C. Ruehlow, Oconomowoc, WI (US); Steven J. Wilcox, Delafield, WI (US); Francis X. Wedel, Lake Mills, WI (US); Graham McLean, Lymm (GB); Phillip Harrison, MacClesfield (GB); Hongping Zhou, Preston (GB)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 09/882,765

(22) Filed: Jun. 15, 2001

(65) Prior Publication Data

US 2002/0190527 A1 Dec. 19, 2002

(51) Int. Cl.[7] .......................... H02P 15/00; H02P 3/00; H02P 9/06; H02J 1/00; H02J 7/00

(52) U.S. Cl. .................. 322/7; 322/8; 307/57; 307/64; 290/40 B

(58) Field of Search .................. 322/7, 8; 307/57, 307/64; 290/40 B

(56) References Cited

U.S. PATENT DOCUMENTS

| 5,278,771 | A | * | 1/1994 | Nyenya ....................... 307/38 |
| 5,684,710 | A | * | 11/1997 | Ehlers et al. ................ 307/115 |
| 5,734,255 | A | * | 3/1998 | Thompson et al. ............. 290/2 |
| 5,754,033 | A | * | 5/1998 | Thomson ..................... 307/57 |
| 5,973,481 | A | * | 10/1999 | Thompson et al. ............. 290/2 |
| 5,994,794 | A | * | 11/1999 | Wehrlen ...................... 307/66 |
| 6,055,163 | A | * | 4/2000 | Wagner et al. ................ 363/37 |
| 6,107,927 | A | * | 8/2000 | Dvorsky et al. ............. 340/658 |
| 6,166,525 | A | * | 12/2000 | Crook .......................... 322/11 |
| 6,172,428 | B1 | * | 1/2001 | Jordan ...................... 290/40 C |
| 6,351,692 | B1 | * | 2/2002 | Eaton et al. ................ 700/287 |

* cited by examiner

Primary Examiner—Nestor Ramirez
Assistant Examiner—Jaydi A. Aguirrechea
(74) Attorney, Agent, or Firm—Boyle Fredrickson Newholm Stein & Gratz S.C.

(57) ABSTRACT

In accordance with the present invention, a system controller and method for monitoring and controlling a plurality of generator sets are provided. Each generator set generates electrical power and includes a generator communications link for connecting a generator set to a network. A user interface allows a user to select a generator set and set values for various predetermined operating parameters of the selected generator sets. Thereafter, a communications link connectable to the network transmits the user set values of the predetermined operating parameters to the selected generator set.

24 Claims, 11 Drawing Sheets

SYSTEM CONTROLLER AND METHOD FOR MONITORING AND CONTROLLING A PLURALITY OF GENERATOR SETS

FIELD OF THE INVENTION

This invention relates to electrical generators, and in particular, to a system control for monitoring and controlling one or more generator sets which are connectable to a load.

BACKGROUND AND SUMMARY OF THE INVENTION

As is known, electrical generators are used in a wide variety of applications. Electrical generators utilize a driving engine directly coupled to a generator or alternator through a common shaft. Upon actuation of the engine, the crankshaft thereof rotates the common shaft so as to drive the alternator which, in turn, generates electrical power. During a commercial power outage, it is often necessary for a consumer to continue supplying electrical power to a load. However, a single generator may not generate enough electrical power to meet the demands of the load. Consequently, multiple electrical generators are often needed to provide sufficient electrical power for the load connected thereto, independent of the commercial electrical power provided by a utility. Alternatively, it is often desirable for a consumer to generate its own electrical power which may be less expensive than the electrical power commercially available or to generate electrical power in excess of its own needs and to sell such power to the utility. In order to interconnect the output of each of the customer's generators to the utility grid, the output of each of the customer's generators must be placed in parallel with the commercial electrical power provided by the utility.

Typically, each generator set connected to a load or to a utility grid is controlled and monitored independently of the other generator sets connected to the load or the utility grid. As such, coordinating operation of each of the generator sets connected to a load or a utility grid may be burdensome and somewhat time consuming. Hence, it is highly desirable to provide a central system control for controlling and monitoring one or more generator sets provided at remote locations which have the capability of supplying electrical power to a load independent from the utility grid or supplying electrical power in parallel with the commercial electrical power provided by the utility.

Therefore, it is a primary object and feature of the present invention to provide a system control for controlling and monitoring a plurality of generator sets connectable to a load.

It is a further object and feature of the present invention to provide a system control controlling and monitoring a plurality of generator sets in parallel with the commercial electrical power provided by a utility.

It is a still further object and feature of the present invention to provide a system control for controlling and monitoring a plurality of generator sets which allows a user to monitor the commercial electrical power supplied by a utility and simultaneously vary the electrical power supplied by the plurality of generator sets as the demand for electrical power by a load change.

It is a still further object and feature of the present invention to provide a system control for controlling and monitoring a plurality of generator sets which is simple to utilize and inexpensive to manufacture.

In accordance with the present invention, the system controller is provided for controlling one or more generator sets connected to a load. Each generator set has the ability to be started and stopped and includes a communication link for connecting the generator set to a network, an engine, and a generator driven by the engine which generates AC power having a magnitude and a power factor and an AC voltage having a magnitude and a frequency. The controller includes a user interface for allowing the user to select a generator set and to set values for various predetermined operating parameters of the selected generator set. The communications link is connectable to the network for transmitting the user set values of the predetermined operating parameters to the selected generator set.

The controller may include a monitoring structure connectable to a utility source which provides AC power having a magnitude and a power factor, AC voltage having a magnitude and a frequency, and AC current having a magnitude and a frequency. The monitoring structure measures the magnitude of the frequency of the AC voltage in AC current and provides the same to the user interface for display. The user interface includes a display screen for displaying the magnitude of the AC power, AC voltage and AC current of the utility source and the power factor of the AC power of the utility source. The communications link transmits the magnitude and the power factor of the AC power of the utility source and the magnitudes and frequencies of the AC voltage and AC current of the utility source to each of the generator sets connected to the network.

The user interface may include a display screen for displaying generator icons identifying corresponding generator sets attached to the network. In addition, the user interface may include a generator setting screen for each generator set connected to the network. Each generator setting screen allowing the user to input the values of a portion of the various operating parameters of the selected generator sets. A first of the various operating parameters is a starting time for starting the selected generator set and a second of a various operating parameters is a stopping time for stopping the selected generator set. The user interface includes a generator command screen for each generator set connected to the network. Each generator command screen allows the user to input the starting time for starting the selected generator set and the stopping time for stopping the selected generator set. Each generator command screen also includes a day setting for allowing the user to select at least one day on which the selected generator set will be started and stopped in response to the starting time and stopping time inputted by the user. A special day screen may also be provided for each generator set connected to the network. The special day screen allows the user to input a special day on which the selected generator set will be stopped.

In accordance with a further aspect of the present invention, a power generation system is provided for providing electrical power. The power generation system includes at least one generator set connectable to a load and to a network. Each generator set has the ability to be started and stopped and includes a generator connectable to a load. The generator generates AC power having a magnitude and a power factor, an AC voltage having a magnitude and a frequency, and an AC current having a magnitude and a frequency. Each generator also includes an engine, a generator control and a generator communications link. An engine is operatively connected to a generator for driving the generator. A generator control is operatively connected to the engine for controlling operation thereof and is operatively connected to the generator for controlling the AC generated thereby. The generator communications link connects the generator control to a network. A user interface allows a user to select a generator set and set values for various predetermined operating parameters of the selected generator set. A system communication link is connectable to the network for transmitting the user set values of the predetermined operating parameters to the generator control of the selected generator set.

The power generation system includes a monitoring structure connectable to a utility source which provides AC power having a magnitude and a power factor, AC voltage having a magnitude and frequency, and AC current having a magnitude and a frequency. The monitoring structure measures the magnitude and the frequency of the AC voltage and the AC current and provides the same to the user interface. The user interface includes the display screen for displaying the magnitudes of the AC power, AC voltage and AC current of the utility source and the power factor of the AC power of the utility source. The systems communications link transmits the magnitude and the power factor of the AC power of the utility source and the magnitudes and frequencies of the AC voltage and AC current of the utility source to each of the generator controls of the generator sets connected to the network.

The user interface also includes the display screen for displaying generator icons identifying corresponding generator sets attached to the network, and a generator setting screen for each generator set connected to the network. Each generator setting screen allows the user to input the values of the portion of the various operating parameters of the selected generator set. A first of the various operating parameters is a starting time for starting the selected generator sets and a second of the various operating parameters is a stopping time for stopping the selected generator set. The user interface includes a generator command screen for each generator set connected to the network. Each generator command screen allows the user to input the starting time for starting the selected generator set and the stopping time for stopping the selected generator set. Each generator command screen also includes a day setting for allowing the user to select the day on which the selected generator set will be started and stopped in response to the starting time and stopping time inputted by the user. The user interface may also include a special day screen for each generator set connected to the network. The special day screen allows the user to input a special day on which the selected generator set will be stopped.

In accordance with a still further aspect of the present invention, a method of managing the distribution of electrical power is provided. The method includes the steps of interconnecting at least one generator set to a load and to a network. Each generator set has the ability to be started and stopped. A generator set is selected and various predetermined operating parameters are set for the selected generator set. The settings of the predetermined operating parameters are transmitted over the network to the selected generators.

The method includes the additional steps providing a utility source. The utility source supplying AC power having a magnitude and a power factor, AC voltage has a magnitude and a frequency, and AC current having a magnitude and a frequency. The magnitude and the frequency of the AC voltage and the AC current are measured. Thereafter, the magnitudes of the AC power, AC voltage and AC current of the utility source and the power factor and the power factor of the AC power of the utility source and the power factor of the AC power of the utility source are displayed to a user.

The magnitude and the power factor of the AC power of the utility source and the magnitude and frequencies of the AC voltage and AC current of the utility source are transmitted to each of the generator sets connected to the network. User generator icons identifying corresponding generator sets attached to the network are displayed. It is contemplated to start the selected generator set to the first predetermined time and stop the selected generator set at a second predetermined time. The first and second predetermined times are transmitted to the selected generator set over the network.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 7 is a command settings display screen for controlling the starting and stopping of the generator structure of FIG. 4;

FIG. 10 is a clock programming screen for allowing a user to program a day and a time for use with the screens of FIGS. 5–9.

DETAILED DESCRIPTION OF THE DRAWINGS

Figure 1:
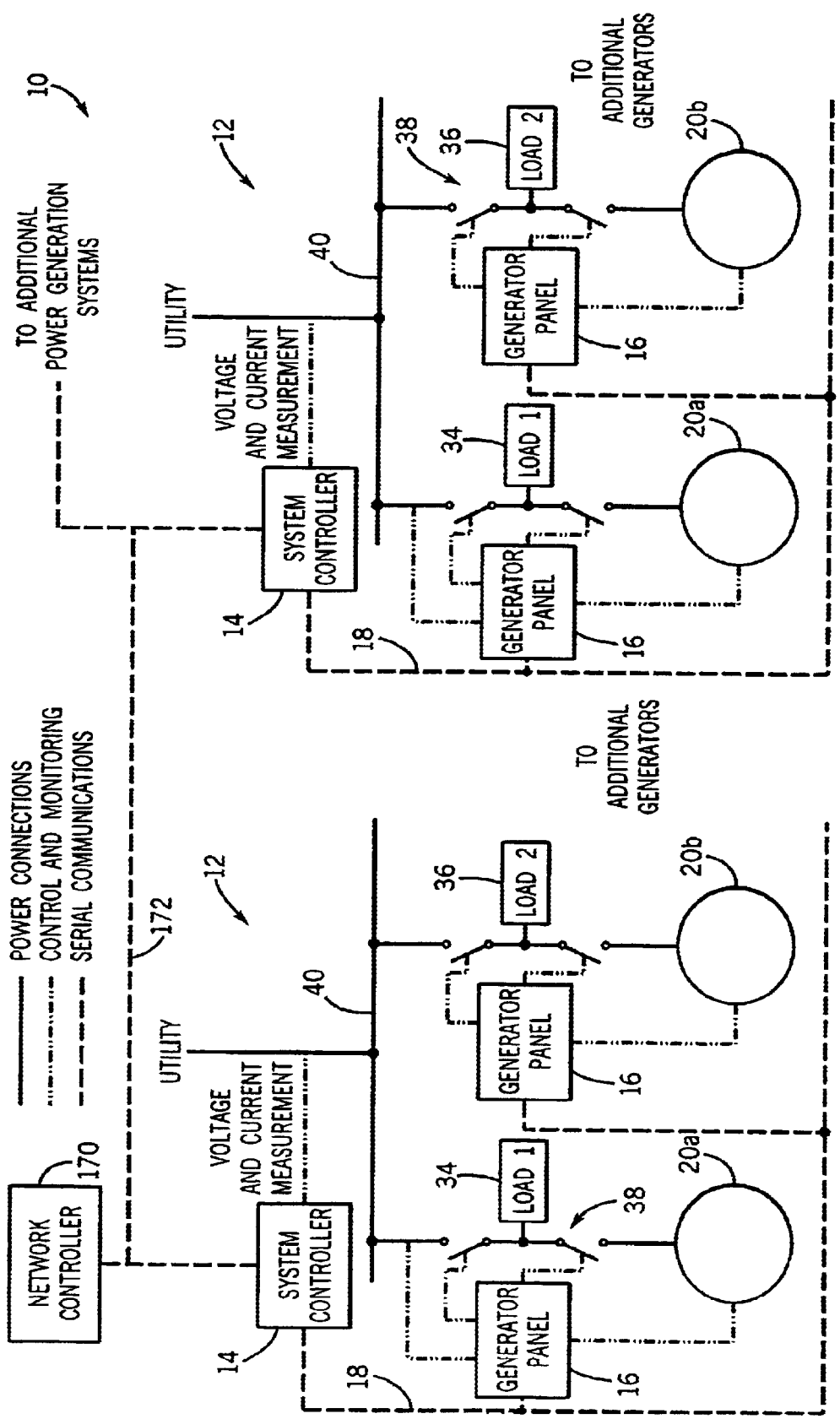
FIG. 1 is a schematic view of a network system for controlling and managing the distribution of electrical power.

Referring to FIG. 1, a network control system for controlling and monitoring a plurality of power generation systems is generally generated by the reference numeral 10. Each of the power generation systems is generally designated by the reference numeral 12. Each power generation system includes system controller 14 operatively connected to a plurality of generator panels 16 by serial communications link 18. Each generator panel 16 is operatively connected to a corresponding generator 20a and 20b, as hereinafter described.

Figure 4A:
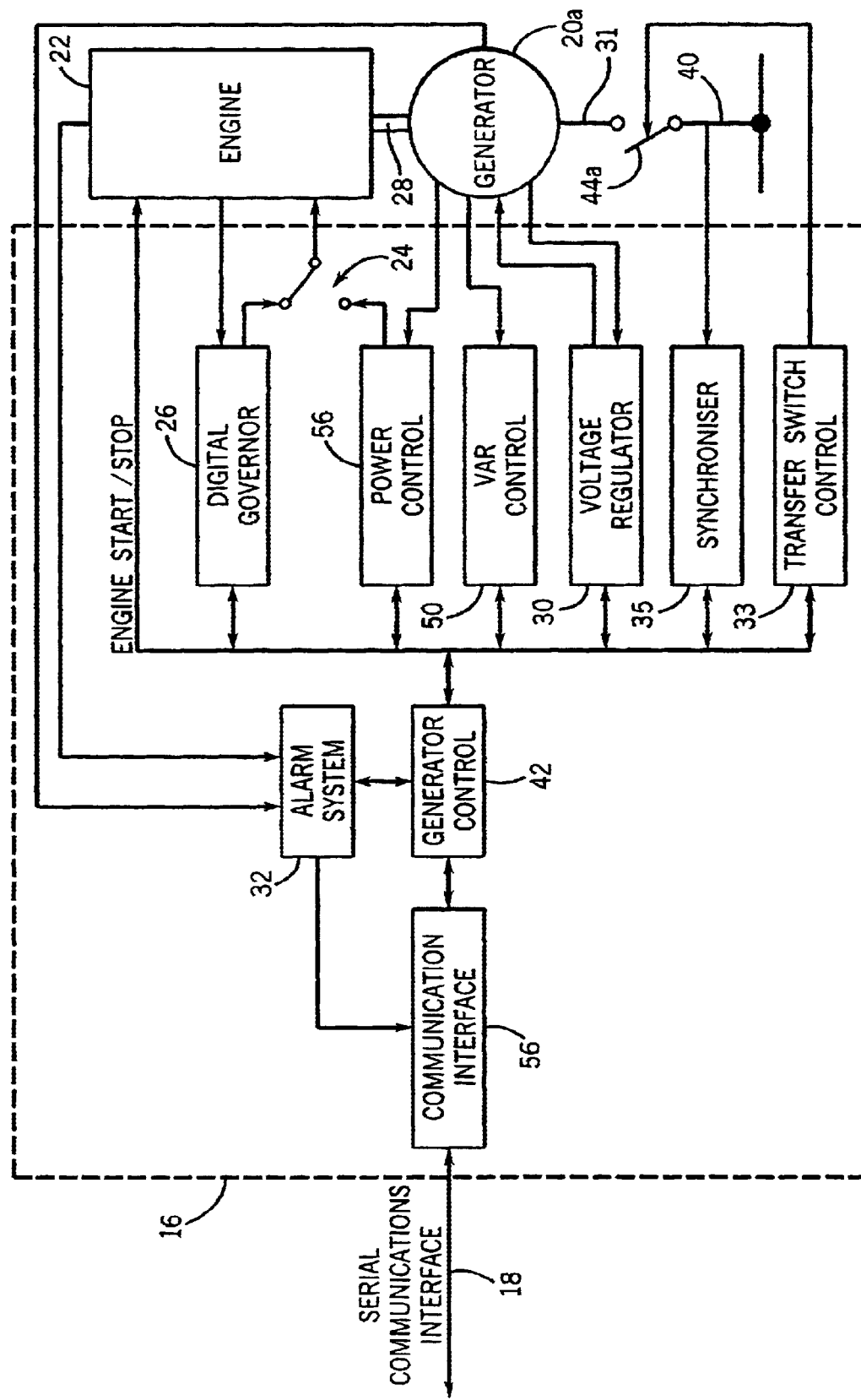
FIG. 4a is a schematic view of a generator structure for generating electrical power for the power generation system of FIG. 3.
Figure 4B:
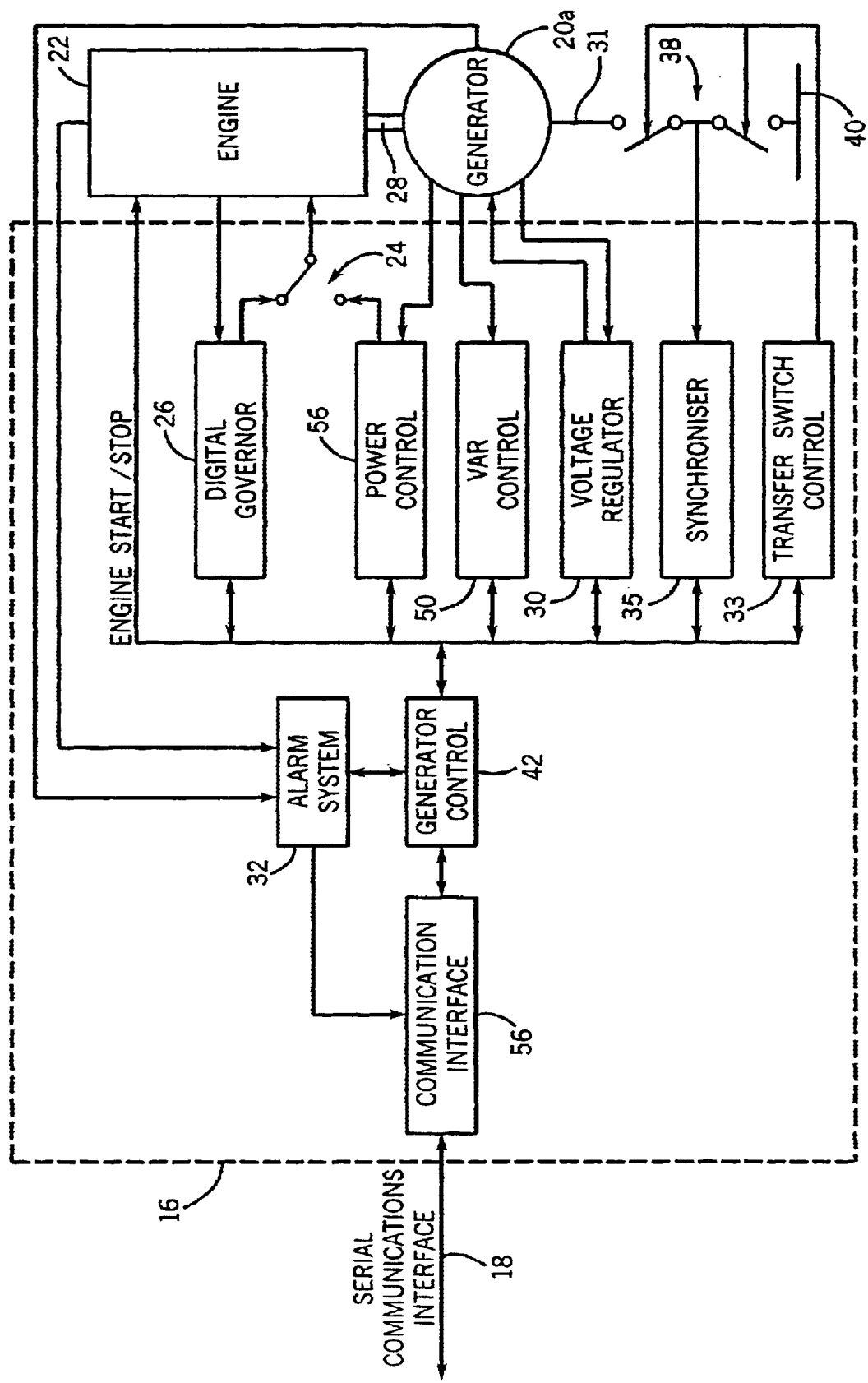
FIG. 4b is a schematic view of the generator structure of FIG. 4a for the power generation system of FIG. 2.

As best seen in FIGS. 4a–4b, generator panel 16 is operatively connected an engine 22 and a corresponding generator 20a or 20b. It can be appreciated that the following description of generator panel 16 operatively connected to generator 20a will be understood to describe a second generator panel 16 operatively connected to generator 20b, as if fully described herein. Engine 22 receives fuel such as natural gas or liquid propane vapor through an intake. The fuel provided to engine 22 is compressed and ignited within the cylinders thereof so as to generate reciprocating motion of the pistons of engine 22. The reciprocating motion of the pistons of engine 22 is converted to rotary motion by a crankshaft. The crankshaft is operatively coupled to generator 20a through shaft 28 such that as the crankshaft is rotated by operation of engine 22, shaft 28 drives generator 20a which, in turn, converts the mechanical energy by engine 22 to electrical power on output 31 of generator 20a for transmission and distribution.

Digital governor 26 is operatively connected to throttle 24 which controls the volume of intake air to engine 22. As is known, digital governor 26 protects engine 22 from overspeed conditions and maintains engine 22 at a desired engine speed which, in turn, causes generator 20a to generate a desired electrical power at a desired frequency. Digital governor 26 controls the engine speed of engine 22 by regulating the position of throttle 24, and hence, the amount of fuel and air provided to the combustion chamber of engine 22. As is known, throttle 24 is movable between a wide-open position wherein engine 22 runs at full power and a closed position wherein engine 22 runs at minimum power. Generator control 42 controls operation of digital governor 26, and hence, throttle 24, as hereinafter described.

As is conventional, generator 20a generates AC voltage having a magnitude and a frequency and AC current having a magnitude and a frequency. In alternating current power transmission and distribution, the cosine of the phase angle (θ) between the AC voltage and the AC current is known as the power factor. The AC power generated by generator 20a may be calculated in according to the expression:

$$P = I \times V \times \cos \theta$$

wherein P is the AC power; I is the root means square of the AC current; and V is the root means square of the AC voltage.

The magnitude of the AC output voltage of generator 20a is monitored by voltage regulator 30. As is conventional, generator 20a includes an armature winding or exciter which controls the magnitude of the AC output voltage of generator 20a. Voltage regulator 30 acts to increase or decrease the excitation of the exciter of generator 20a to the degree needed to maintain the magnitude of the AC output voltage at a desired value.

It is contemplated to operatively connect engine 22 and generator 20a to an alarm system 32. Alarm system 32 monitors various operating conditions of engine 22 and generator 20a and provides a warning if any of the operating conditions fall outside normal operating levels. In addition, alarm system 32 is operatively connected to generator control 42 such that generator control 42 may shut down generator 20a in response to certain, predetermined alarm conditions on engine 22 and/or generator 20a so as to prevent damage to power generation system 12.

Figure 2:
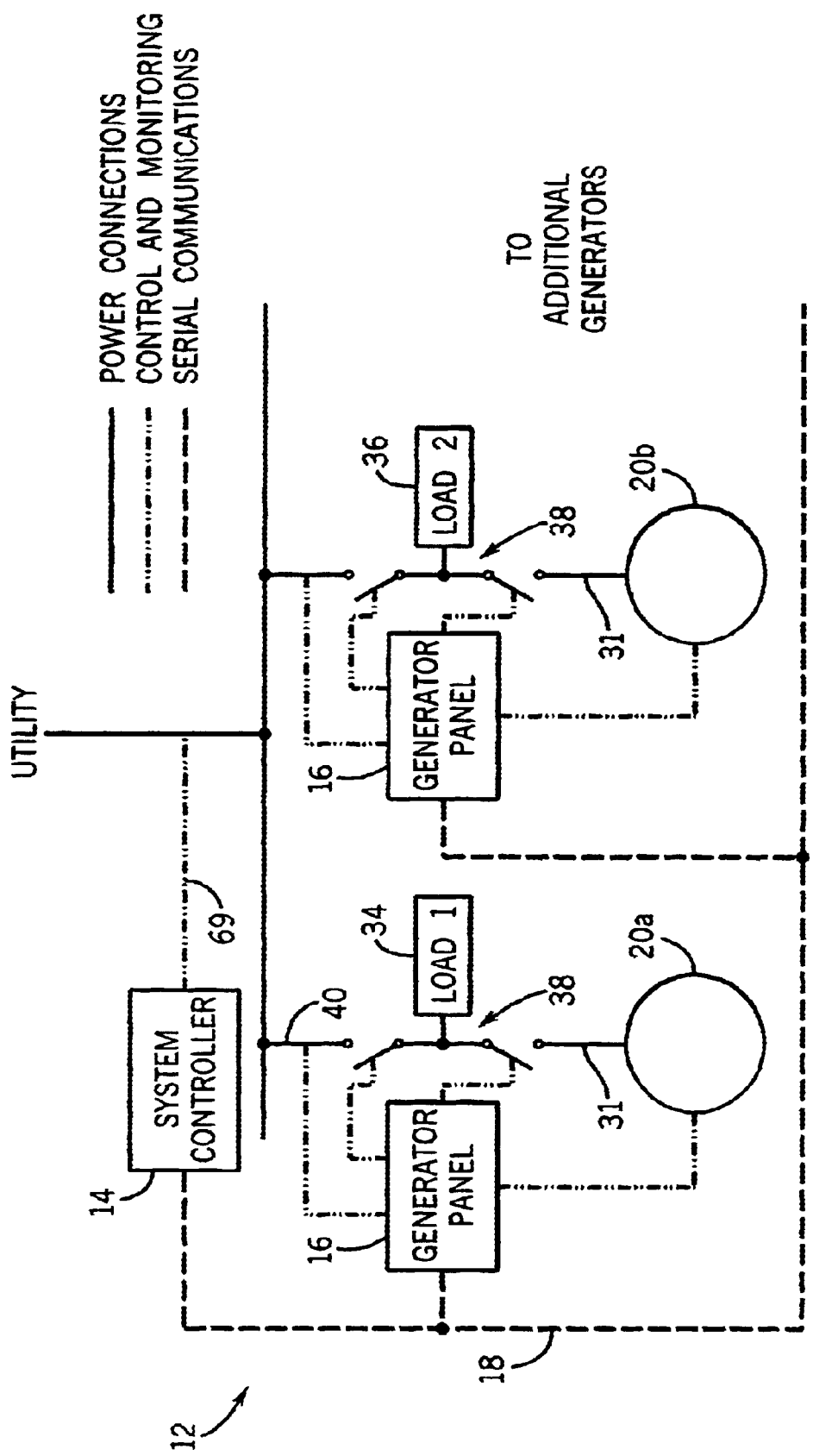
FIG. 2 is a schematic view of a first embodiment of a power generation system.

Referring to FIGS. 2 and 4b, it is contemplated to connect generators 20a and 20b to corresponding loads 34 and 36, respectively, through corresponding transfer switches 38. Each transfer switch 38 isolates the electrical power supplied by a utility on supply line 40 from the electrical power supplied at outputs 31 of corresponding generators 20a and 20b. Electrical power supplied on supply line 40 is monitored such that if the electrical power from the utility fails, engines 22 are started by generator controls 42, FIG. 4b, in a conventional manner. With engines 22 of power generation systems 12 started, generators 20a and 20b generate electrical power, as heretofore described. When the electrical power generated by generators 20a and 20b reaches the magnitude and frequency desired by the user, generator control 42 through transfer switch control 33 causes transfer switches 38 to transfer loads 34 and 36 from supply line 40 to corresponding outputs 31 of generators 20a and 20b, respectively. In response to restoration of electrical power on supply line 40 by the utility, generator controls 42 through transfer switch controls 33 cause transfer switches 38 to transfer loads 34 and 36 from outputs 31 of generators 20a and 20b, respectively, to supply line 40. Thereafter, engines 22 are stopped by corresponding generator controls 42. By stopping engines 22, generators 20a and 20b no longer generate electrical power.

Figure 3:
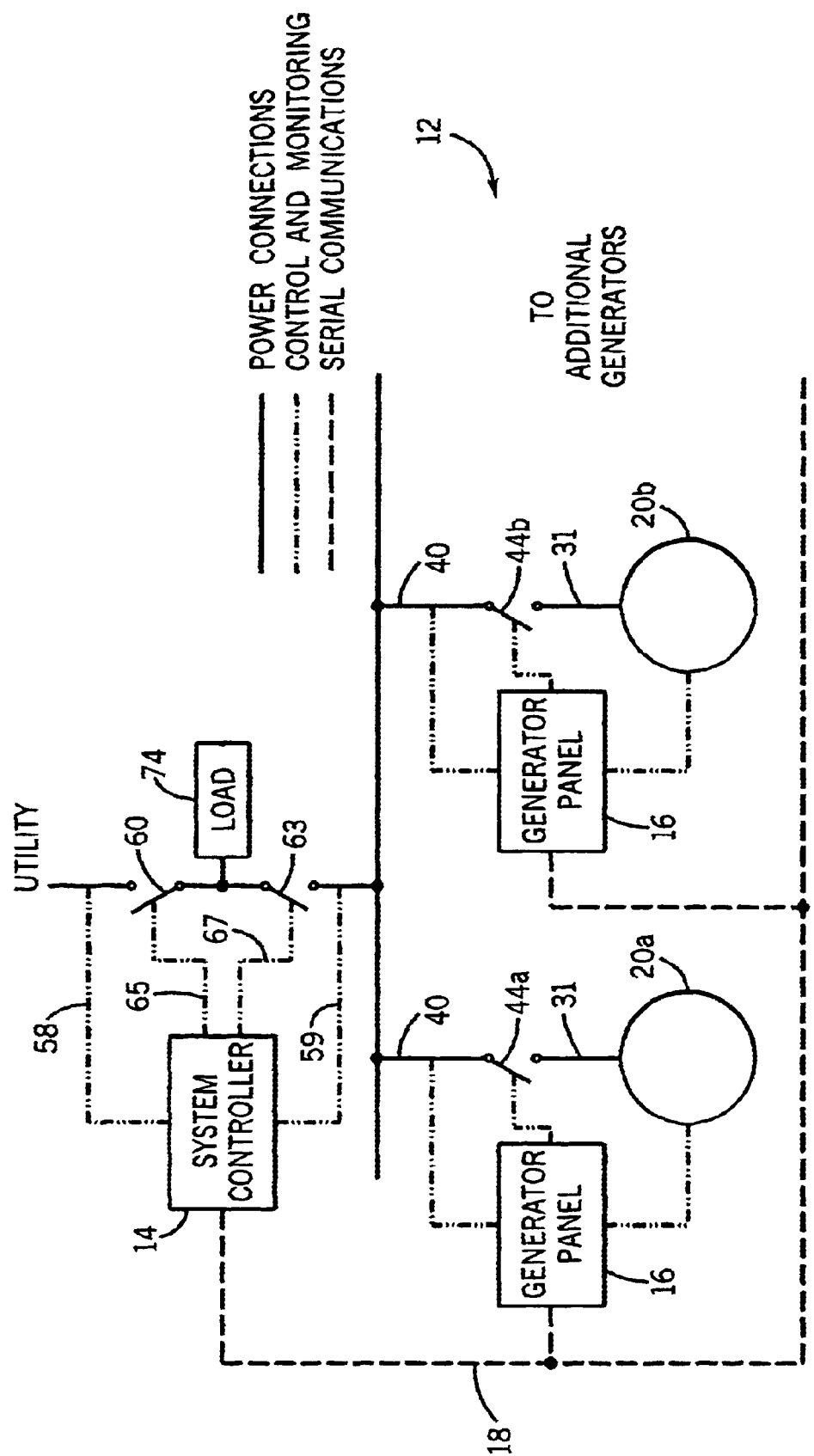
FIG. 3 is a schematic view of a second embodiment of a power generation system.

Alternatively, referring to FIGS. 3 and 4a, in the event of a power outage, generators 20a and 20b may be put in parallel with each other in order to supply electrical power to load 74. Generators 20a and 20b are put in parallel with each other by connecting outputs 31 of generators 20a and 20b to supply line 40. However, prior to connecting outputs 31 of generators 20a and 20b to supply line 40, it is necessary to match the magnitude of the AC output voltage of generator 20a with the magnitude of the AC output voltage of generator 20b. In addition, the outputs of generators 20a and 20b must be synchronized. In order to synchronize the outputs of generators 20a and 20b, the phase sequences and the frequencies of the outputs of generators 20a and 20b must be identical. Once synchronized, generator control 42 through transfer switch control 33 causes transfer switches 44a and 44b to close such that outputs 31 of generators 20a and 20b, respectively, are coupled to supply line 40. Thereafter, supply line 40 is connected to load 74, as hereinafter described.

It is also contemplated to put generators 20a and 20b in parallel with the utility by connecting outputs 31 of generators 20a and 20b to the utility. In order to put generators 20a and 20b in parallel with the utility, it is necessary to match the magnitude of the AC output voltages of generators 20a and 20b with the magnitude of the AC voltage of the utility. In addition, the outputs of generators 20a and 20b must be synchronized with the utility. In order to synchronize the outputs of generators 20a and 20b with the utility, the phase sequences and the frequencies of the outputs of generators 20a and 20b must be identical in phase and frequency with the utility.

Referring back to FIGS. 4a and 4b, by way of example, voltage matching is accomplished by voltage regulators 30 of generator panels 16. Each voltage regulator 30 is supplied with the magnitude of the AC voltage provided by the utility, as hereinafter described, and thereafter, raises or lowers the AC voltage provided by corresponding generators 20a or 20b to precisely match the magnitude of the AC voltage provided by the utility under the control of corresponding generator controls 42 of generator panels 16. As such, it is contemplated to operatively connect generator controls 42 of generator panels 16 to supply line 40 to monitor the utility. Synchronization is achieved by increasing or decreasing the engine speed, as heretofore described, such that phase sequence and the frequency of the AC outputs of generators 20a and 20b are identical to the phase and frequency supplied by the utility. Synchronizers 35 monitor the AC power provided by the utility and provide such information to corresponding generator controls 42. Once synchronization is achieved, transfer switches 44a and 44b are closed by generator controls 42 through transfer switch controls 33 such that outputs 31 of generators 20a and 20b, respectively, are coupled to supply line 40. Thereafter, supply line 40 is connected to the utility, as hereinafter described.

When generators 20a and 20b are connected in parallel with the utility, the AC output voltages of generators 20a and 20b cannot be varied by excitation of corresponding exciters of generators 20a and 20b. Excitation of exciters of generators 20a and 20b controls the power factors of the electrical power supplied by generators 20a and 20b to the utility. As such, the excitation of exciters of generators 20a and 20b when generators 20a and 20b are connected in parallel with the utility is known as volt-ampere-reactance (VAR) control, block 50.

Further, when generators 20a and 20b are connected in parallel with the utility, the opening and closing of throttles 24 by digital governors 26 does not change the engine speeds of corresponding engines 22. The opening and closing of throttles 24 increases the AC power supplied to the utility by generators 20a and 20b. As such, the opening and closing of throttles 34 when generators 20a and 20b are connected in parallel with the utility is known as power control, block 52.

Generator controls 42 of the generator panels 16 are operatively connected to serial communications link 18 by communication interfaces 56. In the preferred embodiment, each communication interface 56 is a RS485. Referring to FIGS. 2 and 3, serial communications link 18 allows system controller 14 to communicate with generator controls 42 of generator panels 16. System controller 14 includes a microcontroller and a visual display. The microcontroller executes a software program which is displayed on the visual display of system controller 14. The software program allows a user to monitor the electrical power supplied by the utility; to monitor various operating conditions of the engines and generators of the power generation systems 12; and to control various operating parameters of power generation systems 12.

Referring to FIG. 3, in a first embodiment, system controller 14 is operatively connected by line 58 to the utility to monitor the utility and to measure the voltage and current provided by the utility. In addition, system controller 14 is operatively connected by line 59 to supply line 40 to monitor the electrical power supplied by generators 20a and 20b. System controller 14 is also operatively connected to switches 61 and 63 by lines 65 and 67 in order to control the opening and closing of switches 61 and 63, for reasons hereinafter described. In an alternate embodiment, FIG. 2, system controller 14 is connected by line 69 to the utility to monitor the utility and to measure the voltage and current provided by the utility.

Figure 5:
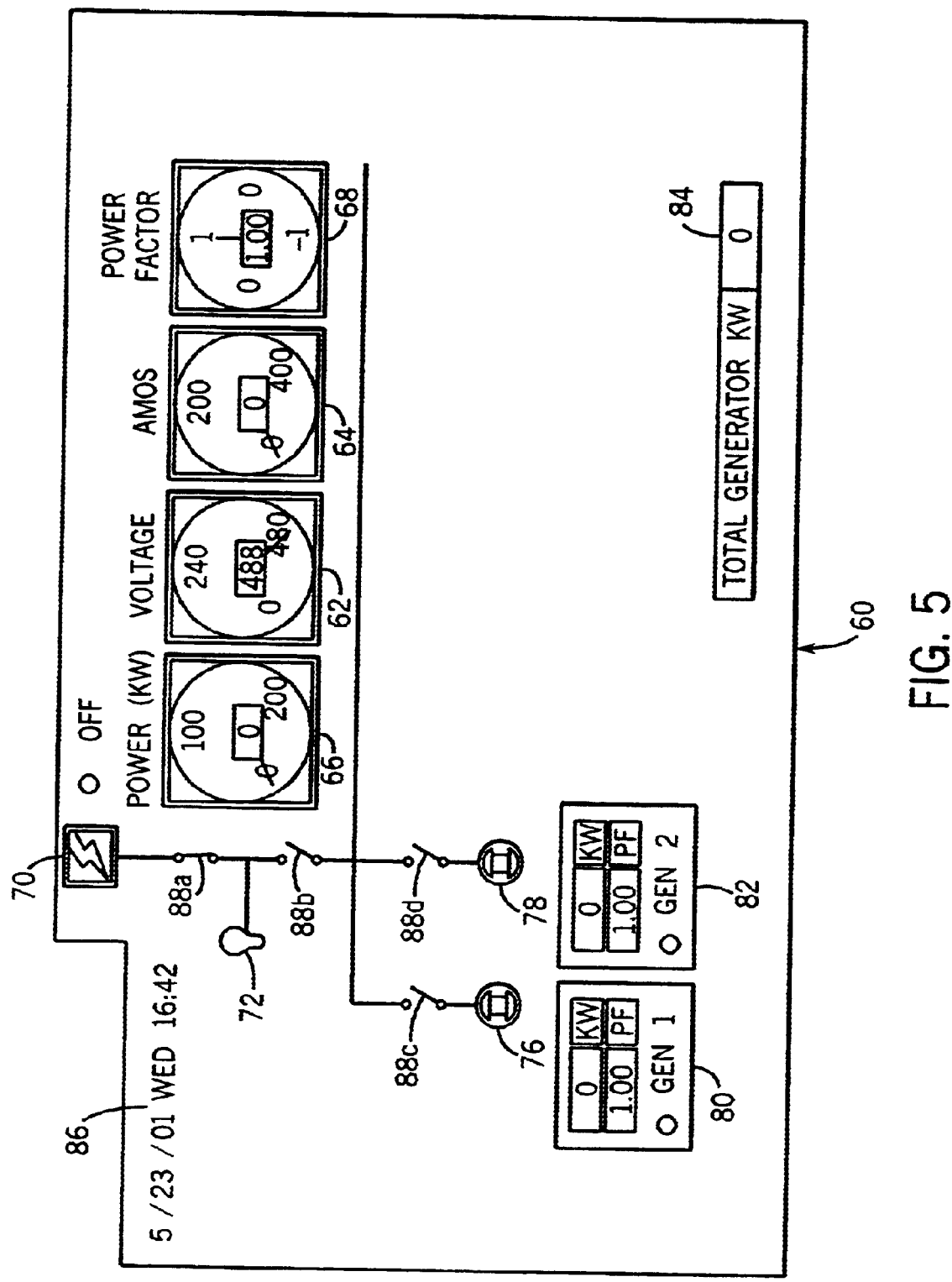
FIG. 5 is a display screen for monitoring the supply and distribution of electrical power provided by the power generation systems of FIGS. 1 and 2.

The magnitudes of the voltage and current provided by the utility are displayed on display screen 60, FIG. 5. Display screen 60 includes voltage display 62 for displaying the magnitude of the rms voltage provided by the utility and current display 64 for displaying the magnitude of the rms current provided by the utility. System controller 14 calculates the power supplied by the utility and power factor of the power supplied and displays the same on display screen 60 at power display 66 and power factor display 68, respectively.

Display screen 60 also includes utility icon 70 representing the utility, load icon 72 representing load 74, and generator icons 76 and 78 representing corresponding generators 20a and 20b, respectively. Generator power displays 80 and 82 are positioned adjacent corresponding generator icons 76 and 78, respectively, to display the power and power factor of the outputs of generators 20a and 20b. In addition, the total power provided by generators 20a and 20b is displayed by total power display 84. Display screen 60 also includes a time display 86 for displaying the date and time, as well as, power connections having switch icons 88a–d therein which represent the states of switches 61, 63, 44a and 44b, respectively, of FIG. 3.

Figure 6:
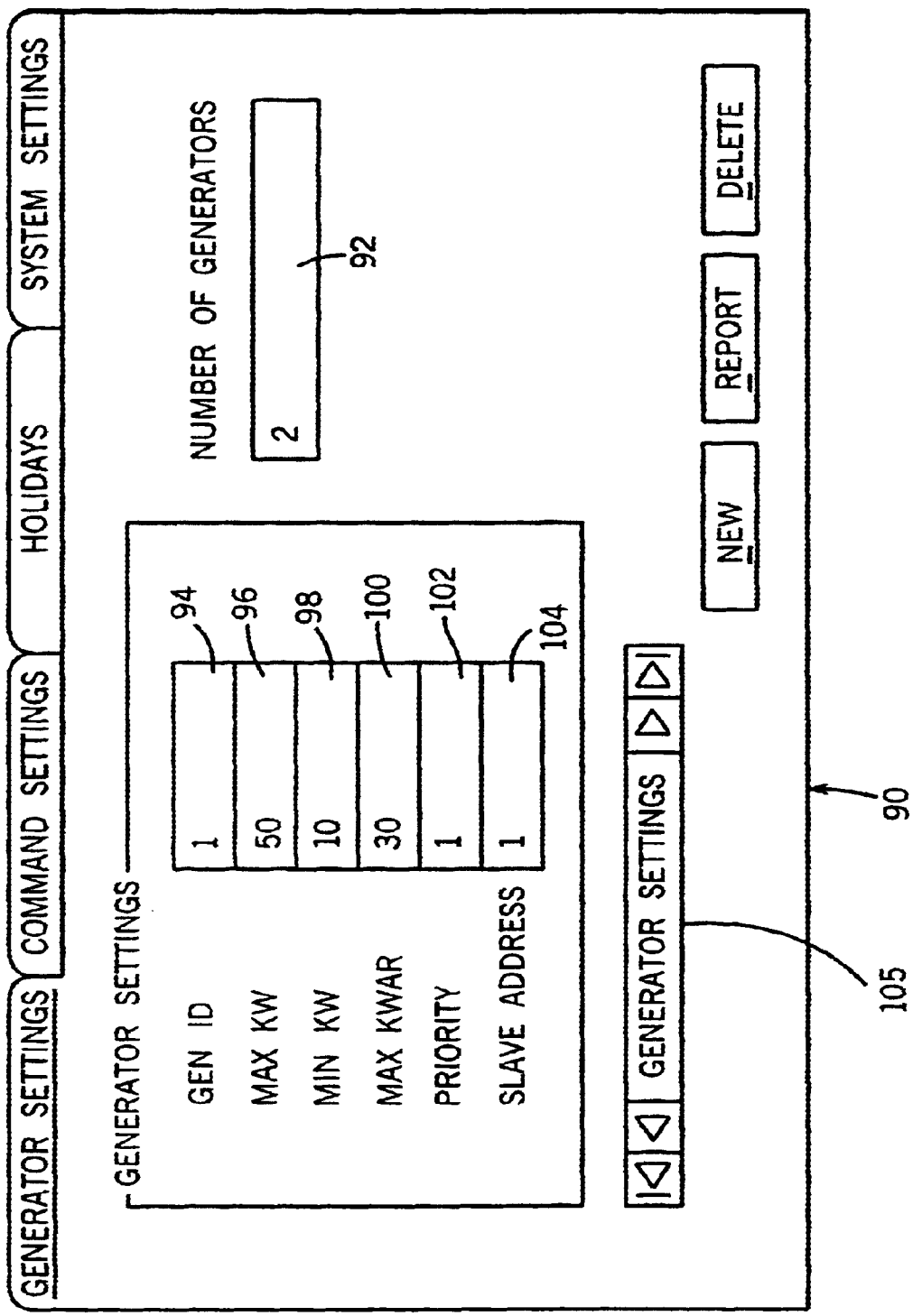
FIG. 6 is a generator settings display screen for allowing the user to provide the generator settings for the generator structure of FIG. 4.

System controller 14 further includes generator settings screen 90, FIG. 6, for allowing a user to input a plurality of settings for generators 20a and 20b. Generator setting screen 90 includes number-of-generators input 92 for allowing a user to input the number of generators connected to communications link 18. In addition, generator setting screen 90 includes inputs for identifying the generator (either generator 20a or generator 20b) for which the settings on the generator settings screen pertain 94; the maximum kilowatts produced by the identified generator 96; the recommended minimum kilowatts for efficient operation of the identified generator 98; the maximum power which may be produced by the identified generator in volt-ampere-reactance 100; the priority of operation of the identified generator as compared to the other generators of the power generation system 102; and a slave address for the generator control 42 of generator panel 16 for the identified generator 104. Generator settings scroll bar 105 is provided for allowing a user to scroll through the settings for each generator.

Figure 7:
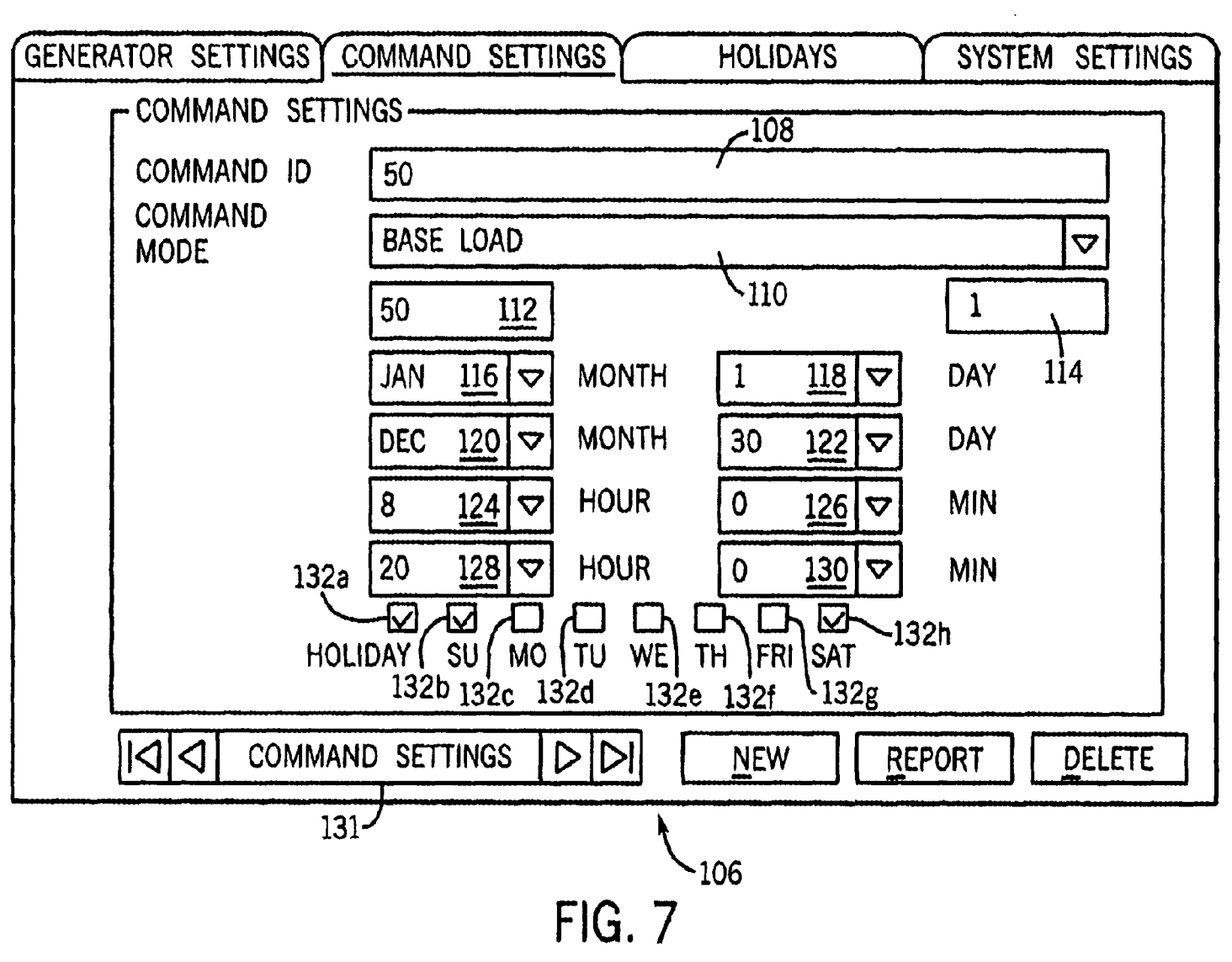

Referring to FIG. 7, system controller 14 further includes a command settings screen generally designated by the reference numeral 106. Command settings screen 106 allows a user to input various parameters for starting and stopping generators 20a and 20b. Command settings screen 106 includes inputs for identifying: a command (by number) for operation of the generators (either generator 20a and generator 20b) 108; a mode the user desires the generators to operate during a prescribed time period 110; the maximum kilowatts to be produced by the generators or consumed from the utility during the prescribed time period depending on the mode selected by the user 112; and a user selected limit for the power factor of the electrical power produced by the generators or consumed from the utility during the prescribed time period depending on the mode selected by the user 114.

Command setting screen 106 also includes inputs for identifying the prescribed time period for which a user desires the generators to operate under the identified command. These inputs include a month 116 and a day 118 for starting the identified generator and a month 120 and a day 122 for stopping the generators. Inputs are also provided for an hour 124 and a minute 126 for starting the generators on each day for which the generators are intended to operate and an hour 128 and a minute 130 for stopping the generators on each day for which the generators are intended to operate. Inputs are also provided for identifying specific days of the week and holidays 132a–h during the prescribed time period for which the generators are intended not to operate. Command scroll bar 131 is provided for allowing the user to scroll through each command.

Figure 8:
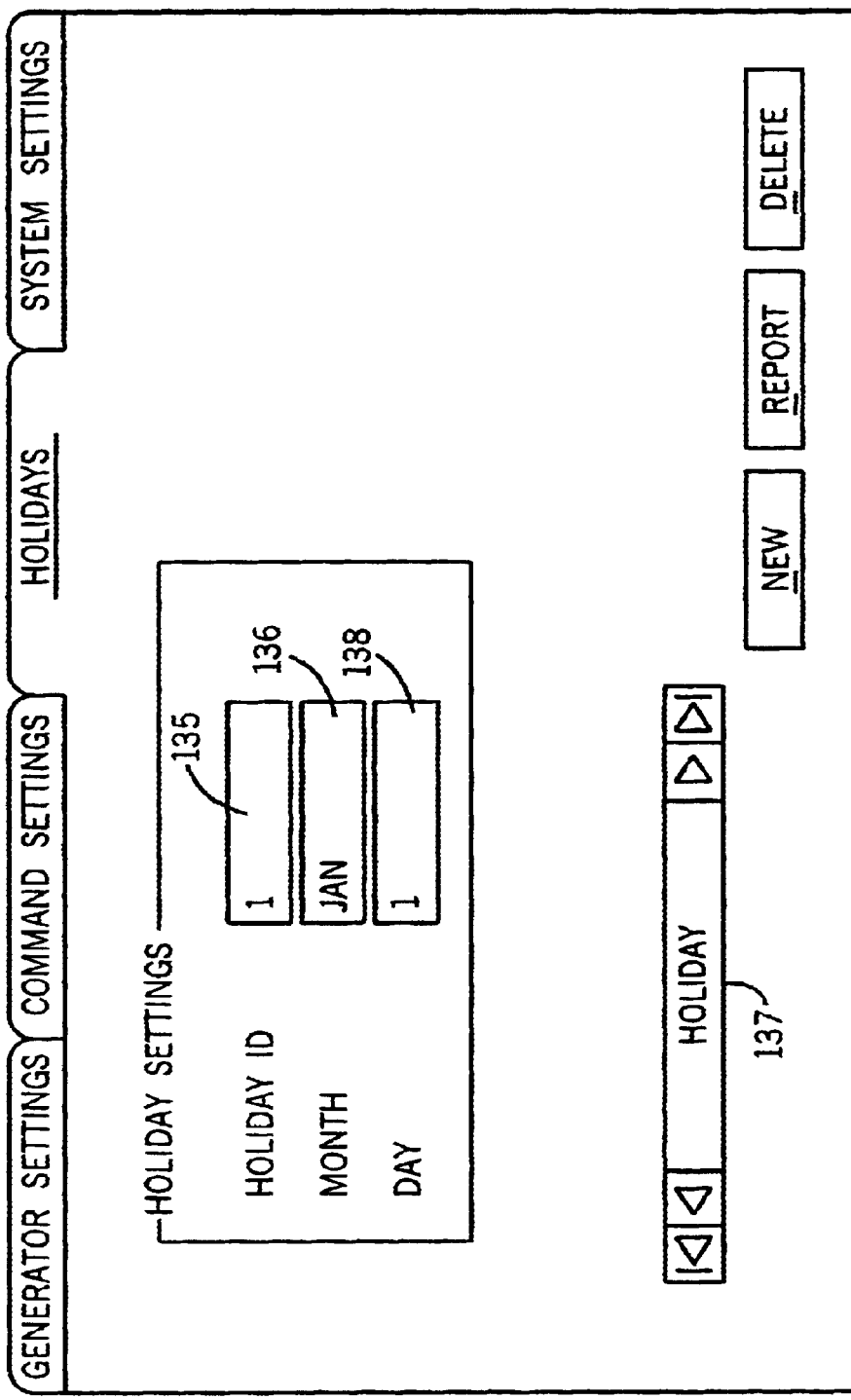
FIG. 8 is a holiday settings display screen for allowing a user to specify days on which the generator structure of FIG. 4 is not operated.

Referring to FIG. 8, system controller 14 further includes a holiday screen generally designated by the reference numeral 134. Holiday screen 134 includes inputs for a user: to identify holidays (by number) on which generators 20a and 20b will not be operational 135; and to specify a month 136 and a day 138 for each holiday identified. Holiday scroll bar 137 is provided for allowing the user to scroll through each holiday identified.

Figure 9:
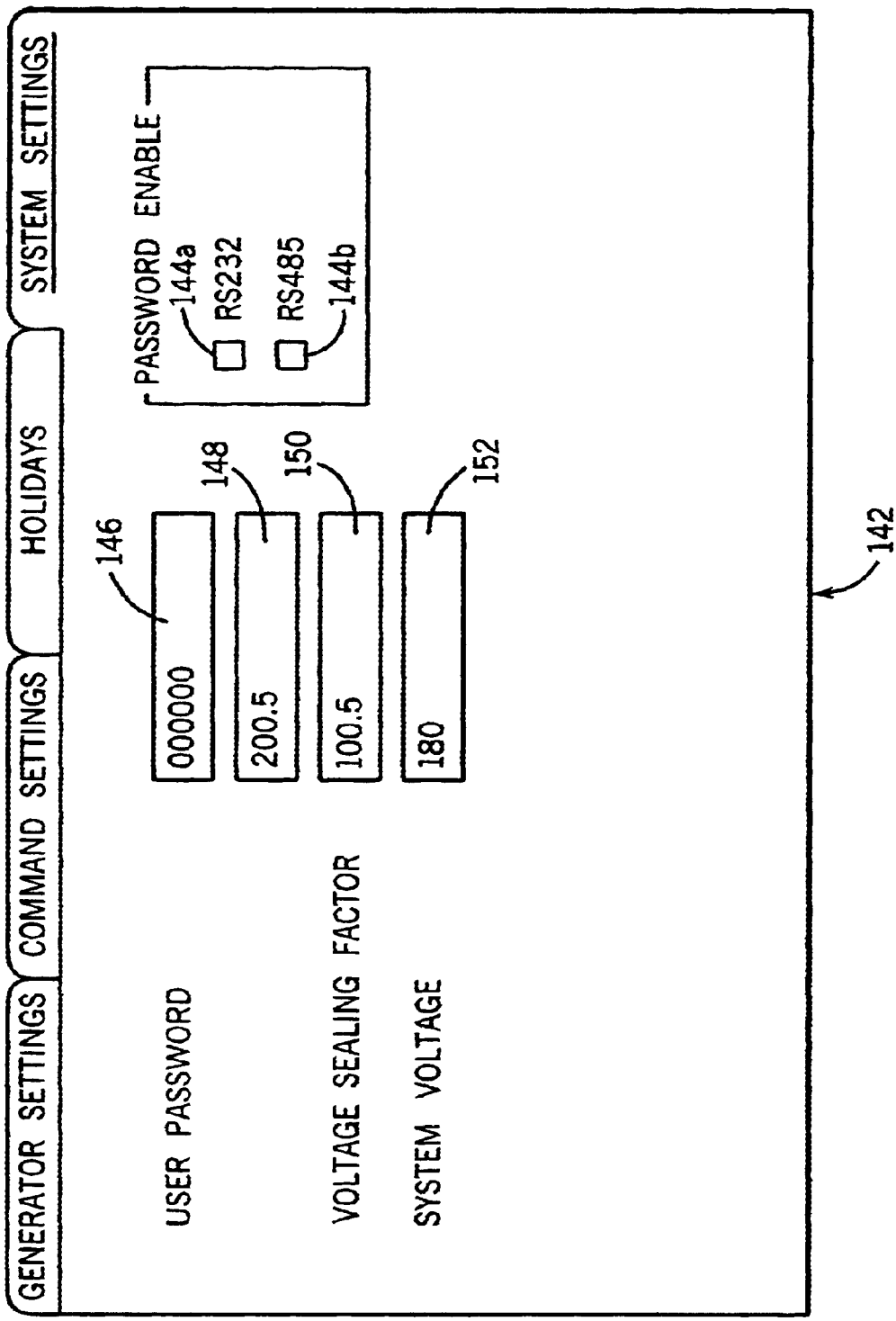
FIG. 9 is a system setting display screen for allowing the user to specify the settings of the power generation system of FIGS. 2–3.

As best seen in FIG. 9, system controller 14 includes a system settings screen generally designated by the reference numeral 142. System settings screen 142 includes inputs for a user: to specify if a password is needed 144a to connect system controller 14 to network 172, for reasons hereinafter described, and if a password is needed 144b to interconnect system controller 14 to serial communications link 18; to specify a password 146 which must be entered by a user to gain access to screens of FIGS. 6–10; to specify a current transformer ratio which steps down the current provided by utility so as to allow such current to be measured by the ammeter of system controller 14; to specify a voltage scaling factor to calibrate the volt meter which measures the voltage provided by the utility 150; and to specify a system voltage 152 to be generated by power generation system 12 (typically, the utility voltage).

Figure 10:
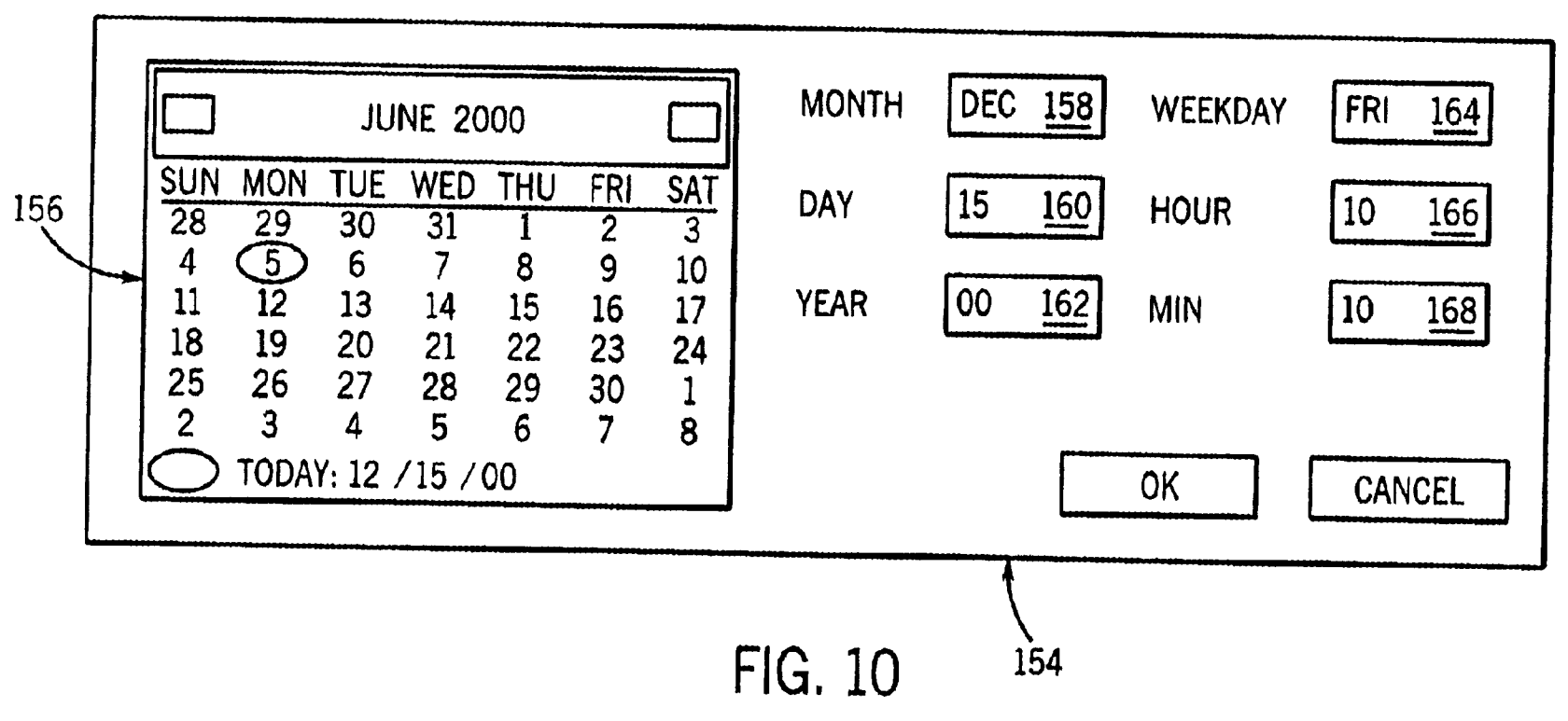

Referring to FIG. 10, a clock-programming screen is generally designated by the reference numeral 154. Clock programming screen 154 includes a scrollable calendar display 156 for displaying a calendar to a user. In addition, the clock-programming screen 154 includes inputs for allowing a user to specify the month 158, the day of the month 160, the year 162, the weekday 164, the hour 166 and the minute 168. The day and time inputted on clock-programming screen 154 are displayed by time display 86 on display screen 60.

In operation, for each power generation system 12, generator panels 16 and system controller 14 are connected to a common serial communications link 18. Initially, a user inputs a plurality of settings for generators 20a and 20b on generator settings screen 90 and the various parameters for starting and stopping generators 20a and 20b on command settings screen 106 of system controller 14, as heretofore described. In addition, the user enters the inputs heretofore described on holiday screen 134, system settings screen 142, and clock programming screen 154 of system controller 14.

Thereafter, in order to gain access to the various screens of system controller 14, the user is prompted to enter the password provided at input 146 of system settings screen 142. After obtaining access to the various screens of system controller 14, the user may monitor power generation system 12 and/or may vary the inputs, as heretofore described.

With respect to power generation systems 12 of FIGS. 1–2 and 4b, system controller 14 monitors the electrical power supplied to supply line 40 by the utility. The magnitude of the rms voltage provided by the utility and the magnitude of the rms current provided by the utility are displayed on display screen 60, FIG. 5. In addition, the power supplied by the utility and power factor of the power supplied are displayed on display screen 60. Further, display screen 60 displays the date and time, as well as, the power connections of power generation system 12.

If the electrical power from the utility fails, generator controls 42 of generator panels 16 start engines 22 such that generators 20a and 20b generate electrical power, as heretofore described. When the electrical power generated by generators 20a and 20b reaches the magnitude and frequency desired by the user, transfer switches 38 transfer loads 34 and 36 from supply line 40 to corresponding outputs 31 of generators 20a and 20b, respectively. The power and power factor of the outputs of generators 20a and 20b, as well as, the total power provided by generators 20a and 20b to loads 34 and 36, respectively, are displayed on display screen 60. Display screen 60 also updates the power connections of power generation system 12.

In response to restoration of electrical power on supply line 40 by the utility, generator controls 42 of generator panels 16 cause transfers switches 38 to transfer loads 34 and 36 from outputs 31 of generators 20a and 20b, respectively, to the utility connected to supply line 40. Thereafter, generator controls 42 stop corresponding engines 22 such that generators 20a and 20b no longer generate electrical power.

Alternatively, generators 20a and 20b may be placed in parallel with a utility by connecting outputs 31 of generators 20a and 20b to the utility through supply line 40. As heretofore described, in order to put generators 20a and 20b in parallel with the utility, it is necessary to match the magnitudes of the AC output voltages of generators 20a and 20b with the magnitude of the AC voltage of the utility. In addition, the outputs of generators 20a and 20b must be synchronized with the utility such that the phase sequences and the frequencies of the outputs of generators 20a and 20b are identical in phase and frequency with the utility.

Once the outputs of generators 20a and 20b are synchronized with the utility and the magnitudes of the AC output voltages of generators 20a and 20b match of the AC voltage of the utility, generator controls 42 of generator powers 16 cause transfer switches 38 to close such that loads 34 and 36 are operatively connected to the utility through supply line 40 and to outputs 31 of generators 20a and 20b, respectively. The AC power and power factor provided by generators 20a and 20b, as well as, the total power provided by generators 20a and 20b, respectively, are displayed on display screen 60. Display screen 60 also updates the power connections of power generation system 12. It can be appreciated that generator controls 42 of generator panels 16 control the power factors of the electrical power supplied by corresponding generators 20a and 20b and the AC power supplied by generators 20a and 20b, as heretofore described, in accordance with the inputs provided by a user on command settings screen 106.

Referring to the embodiment of FIGS. 3 and 4a in the event of a power outage, system controller 14 advises each of generator controls 42 of generator panels 16 accordingly. Generator controls 42 of generator panels 16 start engines 22 such that generators 20a and 20b generate electrical power, as heretofore described. When the electrical power generated by generators 20a and 20b reaches the magnitude and frequency desired by the user, transfer switches 44a and 44b close so as to connect supply line 40 to corresponding outputs 31 of generators 20a and 20b, respectively. Thereafter, system controller 14 opens switch 61 and closes switch 63 in order to connect supply line 40 to load 74, and to hence, transfer load 74 from the utility to generators 20a and 20b. The power and power factor provided by generators 20a and 20b, as well as, the total power provided by generators 20a and 20b to load 74, are displayed on display screen 60. Display screen 60 also updates the power connections of power generation system 12.

In response to restoration of electrical power by the utility, system controller 14 advises generator controls 42 of generator panels 16 accordingly. Thereafter, system controller 14 closes switch 61 and opens switch 63 in order to connect the utility to load 74. In addition, generator controls 42 of generator panels 16 open transfer switches 44a and 44b so as to disconnect the outputs 31 of generators 20a and 20b, respectively, from supply line 40. Generator controls 42 stop corresponding engines 22 such that generators 20a and 20b no longer generate electrical power, or alternatively, system controller 14 returns to operating generators 20a and 20b, as provided by a user on command setting screen 106 Display screen 60 updates the information displayed thereon accordingly.

Alternatively, generators 20a and 20b may be placed in parallel with the utility by connecting outputs 31 of generators 20a and 20b to the utility through supply line 40. As heretofore described, in order to put generators 20a and 20b in parallel with the utility, it is necessary to match the magnitudes of the AC output voltages of generators 20a and 20b with the magnitude of the AC voltage of the utility. In addition, the outputs of generators 20a and 20b must be synchronized with the utility such that the phase sequences and the frequencies of the outputs of generators 20a and 20b are identical in phase and frequency with the utility.

Once the outputs of generators 20a and 20b are synchronized with the utility and the magnitudes of the AC output voltages of generators 20a and 20b match of the AC voltage of the utility, transfer switches 44a and 44b close such that outputs 31 of generators 20a and 20b are connected to supply line 74. Thereafter, system controller 14 closes switch 63 in order to connect supply line 40 to the utility and to load 74. The power and power factor provided by generators 20a and 20b, as well as, the total power provided by generators 20a and 20b to load 74, are displayed on display screen 60. Display screen 60 also updates the power connections of power generation system 12.

It is contemplated that system controller 14 incorporate a load shedding feature such that if the electrical power from the utility fails and if the plurality of generators in power generation system 12 are inadequate to provide sufficient electrical power to support load 74, system controller 14 may disconnect a portion of load 74 from supply line 40. A circuit breaker with a shunt trip is provided in series with portions of load 74. If the electrical power from the utility fails, system controller 14 trips the circuit breaker and removes a corresponding portion of load 74 from the system. It is contemplated that multiple load shedding relays be provided and the system controller 14 only shed such portion of load 74 as necessary to allow the generators of power generation system 12 to provide adequate electrical power to the load. By way of example, if one or more of the plurality of electrical generators of power generation system 12 are off line, additional portions of the load may be shed in order to for the generators in operation to provide adequate electrical power to load 74.

Referring back to FIG. 1, it is contemplated that network system 10 include a network controller 170 which is operatively connected to a communication network 172 such as a telephone network, a computer network, the internet, or a combination for communication thereon. Network controller includes a microprocessor and one or more visual displays. It is further contemplated to interconnect systems controller 14 to network 172, as heretofore described. It is contemplated that the microcontroller of network controller 172 execute a software program so as to allow a user to access each system controller 14 and selectively display the screens, FIGS. 5–10 of the selected system controller 14 on the visual display of the network controller 170. As such, the network system 10 allows for a single user to monitor several power generation systems 12 from a single locale and to control operation of these power generation systems 12 in the heretofore described. Consequently, a user is able to view the current operating conditions of each of the power generation systems 12, as well as, configure system controllers 14 from the remote locale. In addition, the user can obtain detailed information from individual generators 20a and 20b from the remote locale.

Various modes of carrying out the invention are contemplated as being within the scope of the following claims particularly pointing out and distinctly claiming the subject matter which is regarded as the invention.

We claim:

1. A controller for controlling a plurality of generator sets connectable to a load, each generator set having the ability to be started and stopped and including a generator communications link for connecting the generator set to a network, an engine, and a generator driven by the engine which generates AC power having a magnitude and a power factor and AC voltage having a magnitude and a frequency, comprising:

a user interface for allowing a user to select each of the plurality of generator sets and to set values for various predetermined operating parameters of each of the generator sets; and a communications link connectable to the network for transmitting the user set values of the predetermined operating parameters to each selected generator set.

2. The controller of claim 1 further comprising a monitoring structure connectable to a utility source which provides AC power having a magnitude and a power factor, AC voltage having a magnitude and a frequency, and AC current having a magnitude and a frequency, the monitoring structure measuring the magnitude and the frequency of the AC voltage and the AC current and providing the same to the user interface for display.

3. The controller of claim 2 wherein the user interface includes a display screen for displaying the magnitudes of the AC power, AC voltage and AC current of the utility source and the power factor of the AC power of the utility source.

4. The controller of claim 2 wherein the communications link transmits the magnitude and the power factor of the AC power of the utility source and the magnitudes and frequencies of the AC voltage and AC current of the utility source to each of the generator sets connected to the network.

5. The controller of claim 1 wherein the user interface includes a display screen, the display screen displaying generator icons identifying corresponding generator sets attached to the network.

6. The controller of claim 1 wherein the user interface includes a generator settings screen for each of a plurality of generator sets connected to the network, each generator settings screen allowing the user to input the values of a portion of the various operating parameters of each selected generator set.

7. A controller for controlling one or more generator sets connectable to a load, each generator set having the ability to be started and stopped and including a generator communications link for connecting the generator set to a network, an engine, and a generator driven by the engine which generates AC power having a magnitude and a power factor and AC voltage having a magnitude and a frequency, comprising:

a user interface for allowing a user to select a generator set and to set values for various predetermined operating parameters of the selected generator set; and a communications link connectable to the network for transmitting the user set values of the predetermined operating parameters to the selected generator set;

wherein a first of the various operating parameters is a starting time for starting the selected generator set and a second of the various operating parameters is a stopping time for stopping the selected generator set and wherein the user interface includes a generator command screen for each generator set connected to the network, each generator command screen allowing the user to input the starting time for starting the selected generator set and the stopping time for stopping the selected generator set.

8. The controller of claim 7 wherein each generator command screen includes a day setting for allowing a user to select at least one day on which the selected generator set will be started and stopped in response to the starting time and stopping time inputted by the user.

9. The controller of claim 7 wherein the user interface includes a special day screen for each generator set connected to the network, the special day screen allowing the user to input a special day on which the selected generator set will be stopped.

10. A power generation system for providing electrical power, comprising;
   a plurality of generator sets connectable to a load and to a network, each generator set having the ability to be started and stopped and including:
      a generator connectable to the load, the generator generating AC power having a magnitude and a power factor, AC voltage having a magnitude and a frequency, and AC current having a magnitude and a frequency;
      an engine operatively connected to the generator for driving the generator, the engine having an adjustable engine speed;
      a generator control operatively connected to the engine for controlling operation thereof and operatively connected to the generator for controlling the AC power generated thereby; and
      a generator communications link for operatively connecting the generator control to the network;
   a user interface for allowing a user to select each of the plurality of generator sets and to set values for various predetermined operating parameters of each selected generator set; and
   a system communications link connectable to the network for transmitting the user set values of the predetermined operating parameters to the generator control of each selected generator set.

11. The power generation system of claim 10 further comprising a monitoring structure connectable to a utility source which provides AC power having a magnitude and a power factor, AC voltage having a magnitude and a frequency, and AC current having a magnitude and a frequency, the monitoring structure measuring the magnitude and the frequency of the AC voltage and the AC current and providing the same to the user interface.

12. The power generation system of claim 11 wherein the user interface includes a display screen for displaying the magnitudes of the AC power, AC voltage and AC current of the utility source and the power factor of the AC power of the utility source.

13. The power generation system of claim 11 wherein the system communications link transmits the magnitude and the power factor of the AC power of the utility source and the magnitudes and frequencies of the AC voltage and AC current of the utility source to each of the generator controls of the generator sets connected to the network.

14. The power generation system of claim 10 wherein the user interface includes a generator settings screen for each generator set connected to the network, each generator settings screen allowing the user to input the values of a portion of the various operating parameters of each selected generator set.

15. The power generation system of claim 10 wherein the user interface includes a display screen, the display screen displaying generator icons identifying corresponding generator sets attached to the network.

16. A power generation system for providing electrical power, comprising:
   at least one generator set connectable to a load and to a network, each generator set having the ability to be started and stopped and including:
      a generator connectable to the load, the generator generating AC power having a magnitude and a power factor, AC voltage having a magnitude and a frequency, and AC current having a magnitude and a frequency;
      an engine operatively connected to the generator for driving the generator, the engine having an adjustable engine speed;
      a generator control operatively connected to the engine for controlling operation thereof and operatively connected to the generator for controlling the AC power generated thereby; and
      a generator communications link for operatively connecting the generator control to the network;
   a user interface for allowing a user to select a generator set and to set values for various predetermined operating parameters of the selected generator set; and
   a system communications link connectable to the network for transmitting the user set values of the predetermined operating parameters to the generator control of the selected generator set;
   wherein a first of the various operating parameters is a starting time for starting the selected generator set and a second of the various operating parameters is a stopping time for stopping the selected generator set and wherein the user interface includes a generator command screen for each generator set connected to the network, each generator command screen allowing the user to input the starting time for starting the selected generator set and the stopping time for stopping the selected generator set.

17. The power generation system of claim 16 wherein each generator command screen includes a day setting for allowing a user to select a day on which the selected generator set will be started and stopped in response to the starting time and stopping time inputted by the user.

18. The power generation system of claim 16 wherein the user interface includes a special day screen for each generator set connected to the network, the special day screen allowing the user to input a special day on which the selected generator set will be stopped.

19. A method of managing the distribution of electrical power, comprising the steps of:
   interconnecting a plurality of generator sets to a load and to a network, each generator set having the ability to be started and stopped;
   selecting each generator set and setting various predetermined operating parameters for each selected generator set; and
   transmitting the settings of the predetermined operating parameters over the network to each selected generator set.

20. The method of claim 19 comprising the additional steps of:
   providing a utility source, the utility source supplying AC power having a magnitude and a power factor, AC voltage having a magnitude and a frequency, and AC current having a magnitude and a frequency;
   measuring the magnitude and the frequency of the AC voltage and the AC current; and
   displaying to a user the magnitudes of the AC power, AC voltage and AC current of the utility source and the power factor of the AC power of the utility source.

21. The method of claim 20 comprising the additional step of transmitting the magnitude and the power factor of the AC power of the utility source and the magnitudes and frequencies of the AC voltage and AC current of the utility source to each of the generator sets connected to the network.

22. The method of claim 20 comprising the additional step of displaying to a user generator icons identifying corresponding generator sets attached to the network.

23. A method of managing the distribution of electrical power, comprising the steps of:
   interconnecting at least one generator set to a load and to a network, each generator set having the ability to be started and stopped;
   selecting a generator set and setting various predetermined operating parameters for the selected generator set;
   transmitting the settings of the predetermined operating parameters over the network to the selected generator set;
   starting the selected generator set at a first predetermined time; and
   stopping the selected generator set at a second predetermined time.

24. The method of claim 23 comprising the additional step of transmitting the first and second predetermined times to the selected generator set over the network.

* * * * *